March 11, 1958  R. C. FERGASON  2,826,030
COTTON HARVESTER WITH A COMBINED MECHANICAL
AND PNEUMATIC CONVEYING SYSTEM
Original Filed Sept. 10, 1949  7 Sheets-Sheet 2

Inventor
Rector C. Fergason
by
Attorney

March 11, 1958 R. C. FERGASON 2,826,030
COTTON HARVESTER WITH A COMBINED MECHANICAL
AND PNEUMATIC CONVEYING SYSTEM
Original Filed Sept. 10, 1949 7 Sheets-Sheet 4

March 11, 1958  R. C. FERGASON  2,826,030
COTTON HARVESTER WITH A COMBINED MECHANICAL
AND PNEUMATIC CONVEYING SYSTEM
Original Filed Sept. 10, 1949  7 Sheets-Sheet 5

Inventor
Rector C. Fergason
by
Attorney

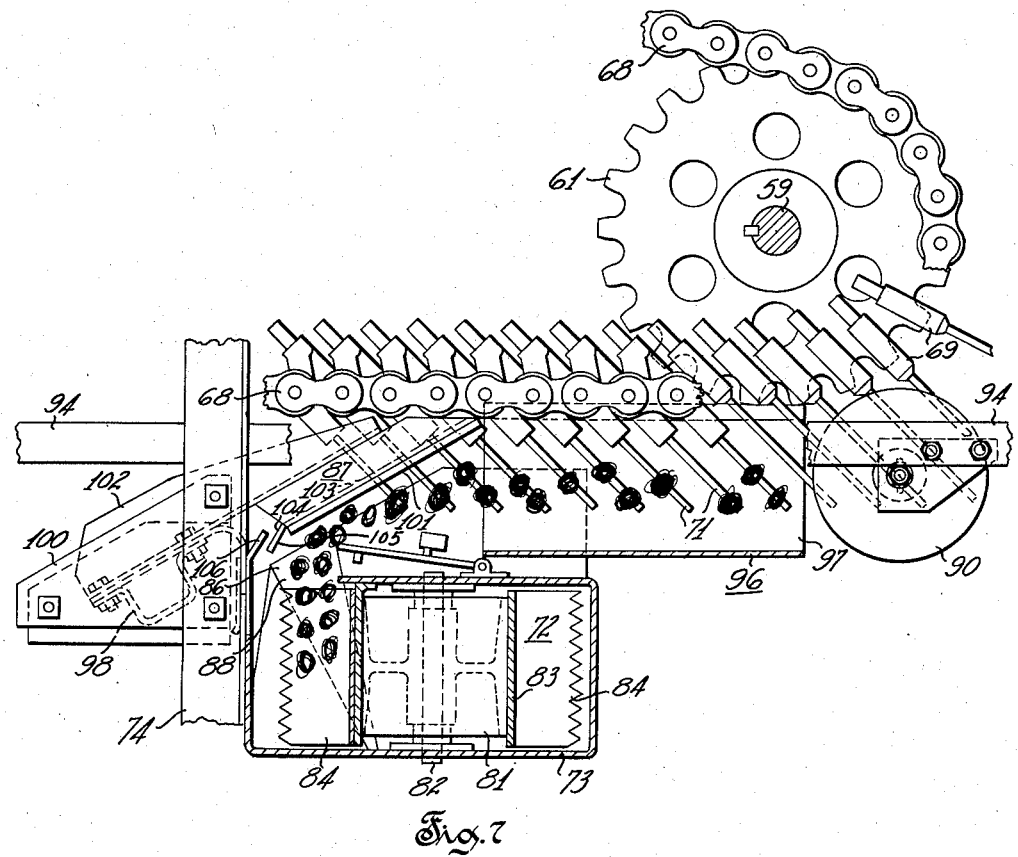

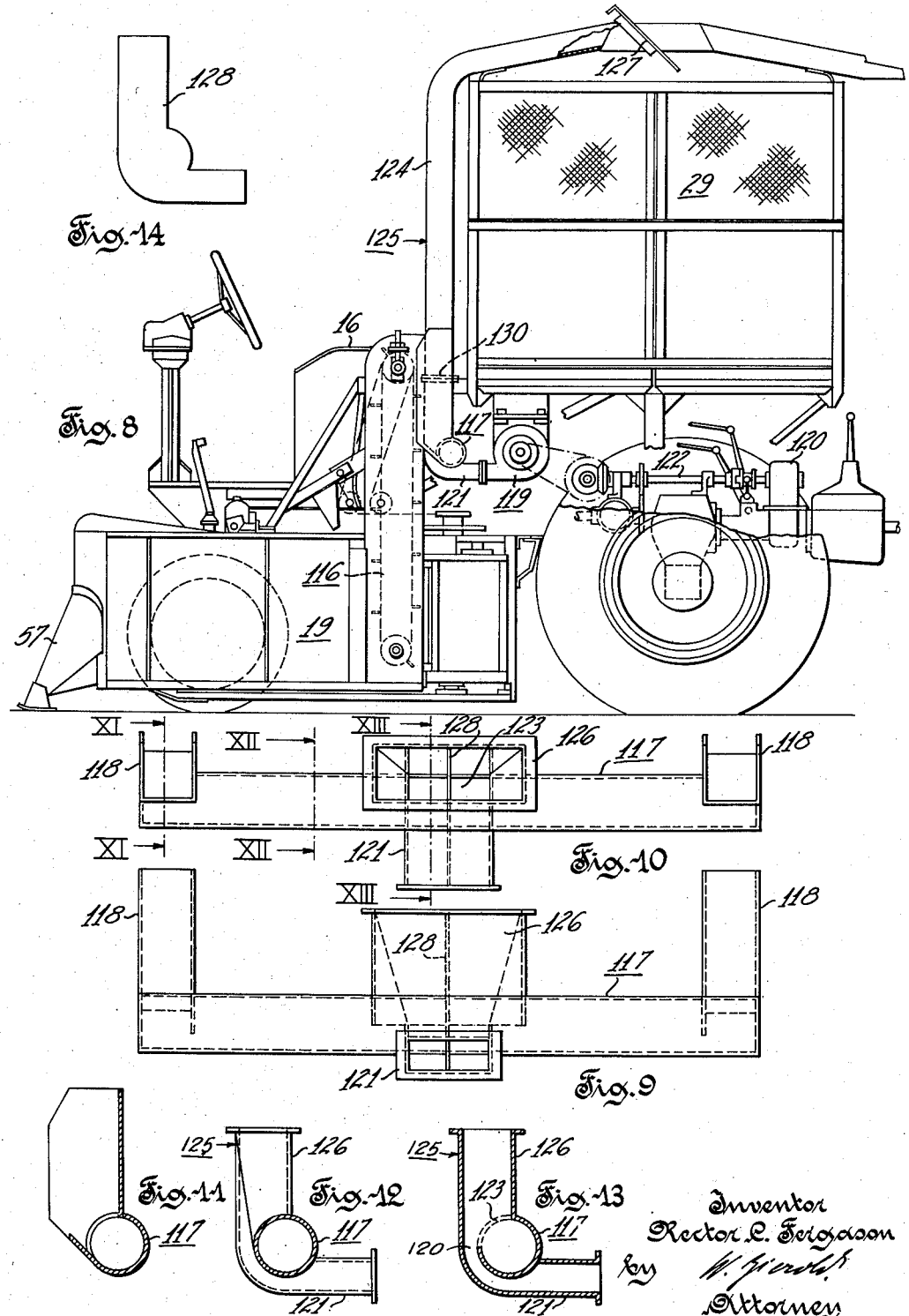

United States Patent Office 2,826,030
Patented Mar. 11, 1958

2,826,030

COTTON HARVESTER WITH A COMBINED MECHANICAL AND PNEUMATIC CONVEYING SYSTEM

Rector C. Fergason, Gadsden, Ala., assignor to Allis-Chalmers Manufacturing Company, Milwaukee, Wis.

Original application September 10, 1949, Serial No. 114,969, now Patent No. 2,671,298, dated March 9, 1954. Divided and this application March 4, 1954, Serial No. 414,014

4 Claims. (Cl. 56—42)

This application is a division of my copending application Serial No. 114,969, filed September 10, 1949 and on which U. S. Patent 2,671,298 issued on March 9, 1954. The present invention relates in general to agricultural implements, and has more particular relation to cotton harvesters wherein during their travel through a field, cotton is picked from standing plants and the picked cotton is conveyed to a suitable point of collection.

It has been customary to employ pneumatic means in cotton harvesters for conveying cotton from a picking unit to a storage basket, the known means including a blower unit having its suction side or intake communicating with the picker unit to withdraw cotton therefrom, the cotton passing into and through the blower from which it is forcibly expelled through a suitable conduit communicating with a storage receptacle or basket. This means for conveying picked cotton from a picker to a basket is not entirely satisfactory as very often a destructive contact takes place between the vanes of the blower and the picked cotton resulting in a loss of grade of the cotton seed due to cracking and a loss of grade of the cotton because of the presence of hulls of cracked seeds which hulls are often not removed in ginning. Moreover, some foreign material is likely to be carried along with the picked cotton and may, depending upon its nature, damage the blower in passing therethrough. In any event the presence of foreign material and cracked hulls of the cotton seed in the gathered crop lessens its value and desirably should be avoided.

Therefore, the principal object of this invention is to provide means for conveying cotton from the picking unit to a receptacle without cracking the seeds carried by the cotton.

A further object of this invention is to provide mechanical and pneumatic means for conveying picked cotton to a receiving basket in a manner wherein the cotton does not pass through the blower as it is conveyed to the receiving basket.

Accordingly, the present invention may be considered as comprising the various features of construction and/or combination as hereinafter more fully set forth in the following detailed description and appended claims, reference being had to the accompanying drawings wherein:

Fig. 7 is an enlarged plan view of the left hand stripper assembly in combination with slat positioning and retarding means and with an elevating conveyer, some parts being broken away and shown in section;

Fig. 8 is a side elevational view with parts broken away and shown in section of a cotton harvester embodying the invention, wherein the picked cotton is elevated into a basket by means of a jet of air produced by a blower;

Fig. 9 is a rear view of the injector and associated conduits for elevating harvested cotton;

Fig. 10 is a plan view of the injector shown in Fig. 9;

Fig. 11 is a section view taken along line XI—XI of Fig. 10;

Fig. 12 is a section view taken along line XII—XII of Fig. 10;

Fig. 13 is a section view taken along line XIII—XIII of Fig. 10; and

Fig. 14 is an elevational view of the plate which separates the dual intake and discharge conduits.

Figure 1:
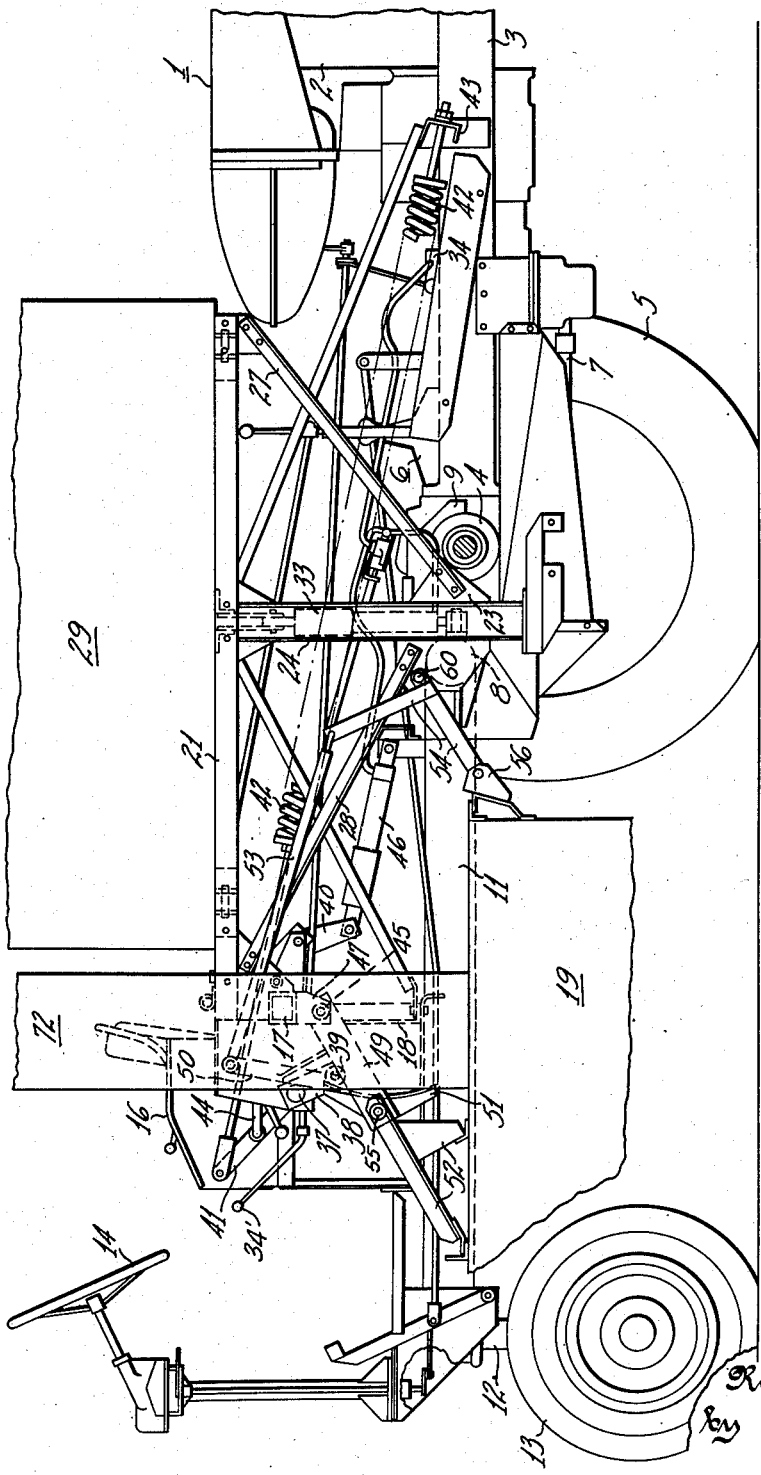
Fig. 1 is a fragmentary side elevation of the forward portion of a cotton harvester, the left rear wheel being omitted and other parts broken away.
Figure 2:
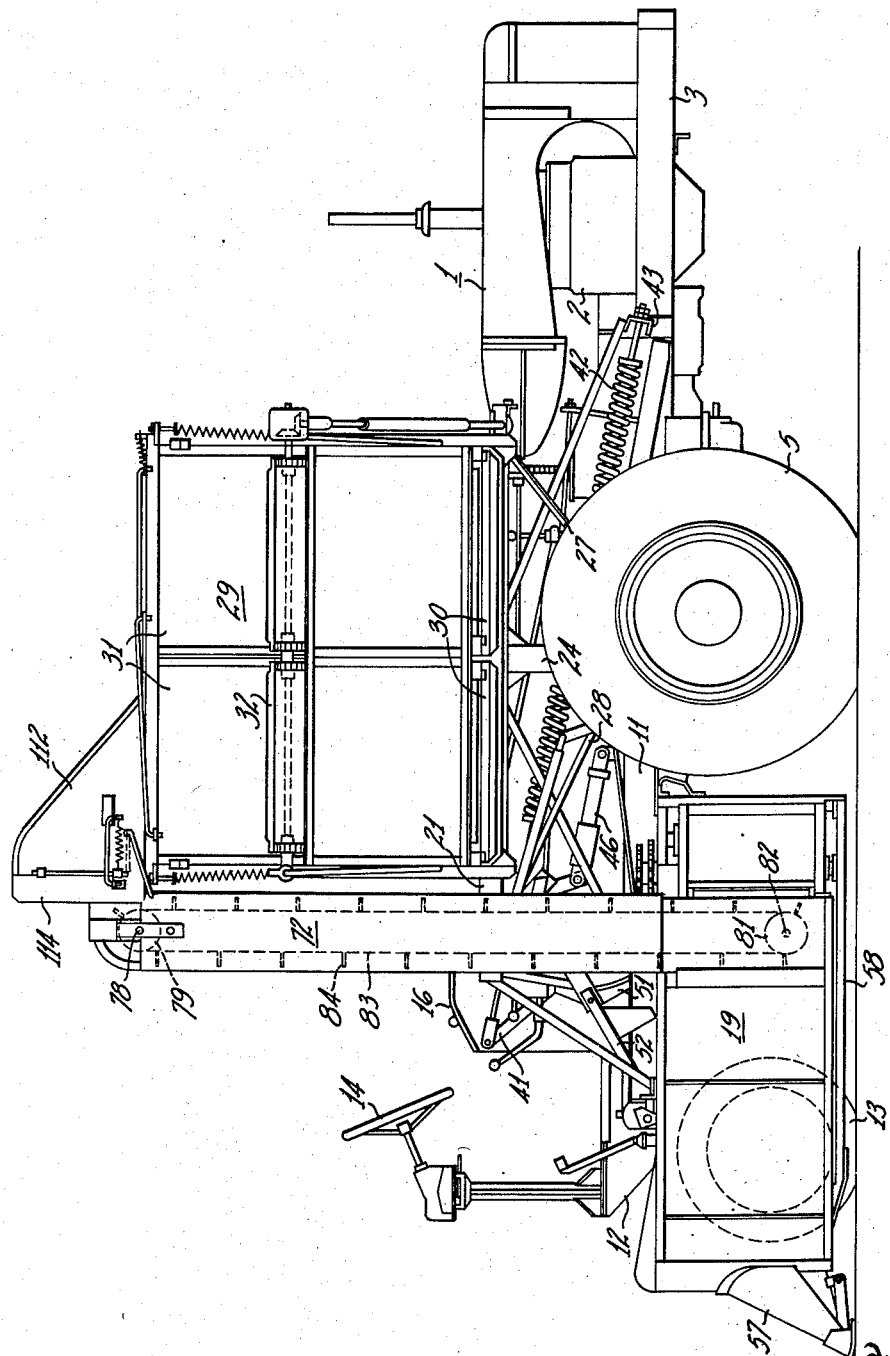
Fig. 2 is a side view on a reduced scale of the cotton harvester partially shown in Fig. 1.
Figure 3:
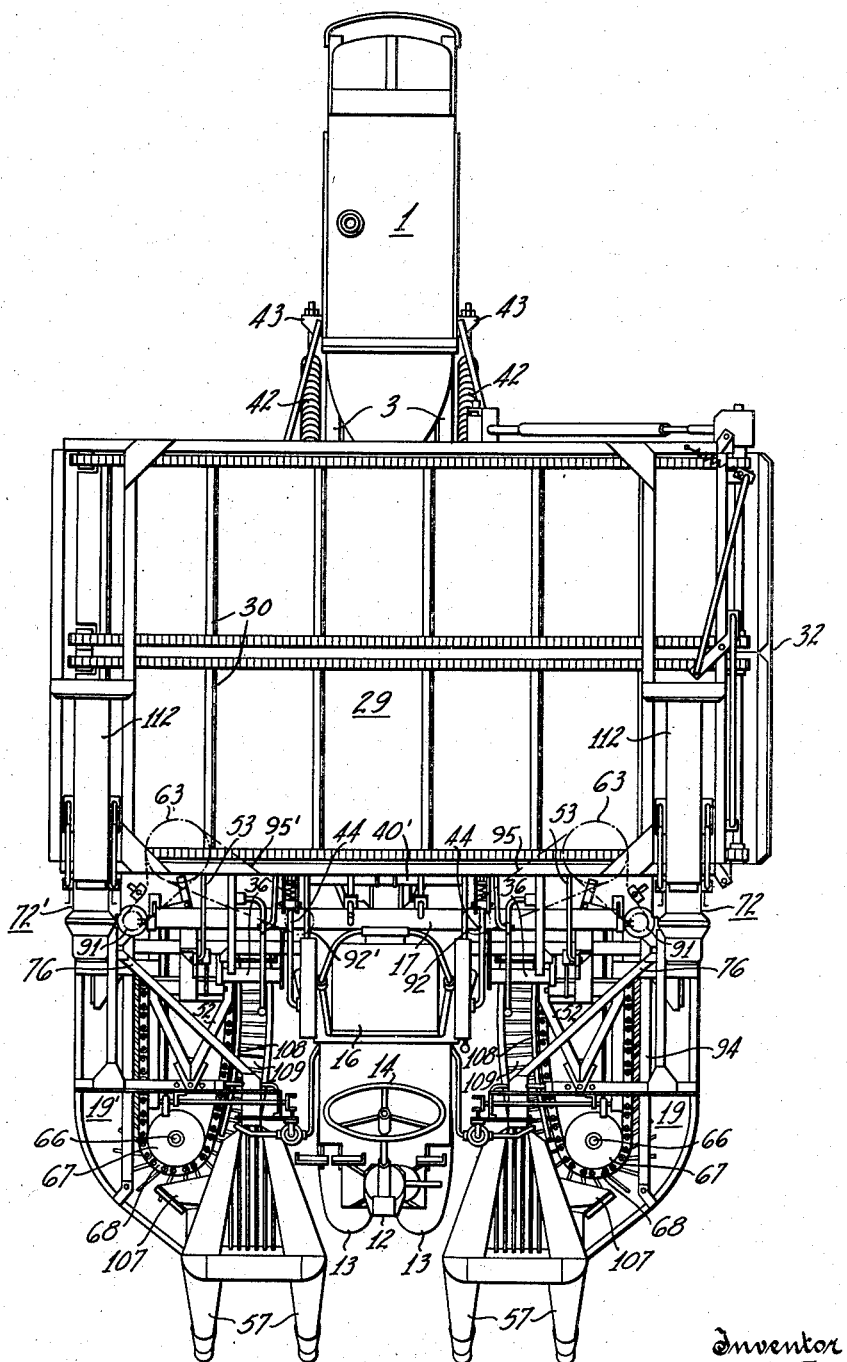
Fig. 3 is a plan view of the cotton harvester.

Referring to Figs. 1 through 3, a tractor 1 consists generally of a rearwardly located engine 2 supported on frame members 3 joined at their forward ends by a transverse axle housing 4 (Fig. 1) and supported thereby as a cantilever beam. This axle housing encloses a differential drive (not shown) operatively connected to traction wheels 5 and 5' and to engine 2 by a conventional change speed transmission enclosed in transmission housing 6. A power take-off shaft 7 (Fig. 1) is operatively connected to engine 2 and serves to drive several power outlet connections which will be described in more detail later.

A T-shaped pipe frame having a transverse portion 8 extending generally parallel in spaced relation to axle housing 4 is connected thereto by suitable tie plates 9. This pipe frame is also provided with a longitudinally extending central portion 11 having the forward end thereof connected to a front steerable support 12 mounting a pair of ground engaging wheels 13 and a steering wheel 14. An operator's seat or station 16 is suitably supported on a forward portion of central portion 11 in convenient relationship to steering wheel 14. A tube member 17 of generally square cross sectional configuration is supported by central portion 11 in transversely extending spaced elevated relation thereto by means of a channel plate member 18 (Fig. 1) and is adapted to serve as a first support frame member for a pair of cotton picking units 19 and 19' which are mounted at opposite sides, respectively, of the machine as shown in Figs. 3 and 4.

A pair of longitudinally extending basket support frame members 21 and 22 (Fig. 4) are supported from gusset plates 23 attached to the outer ends of frame member 8 by means of vertical frame members 24. Frame members 21 and 22 are also suitably braced by angle members 27 and 28 (Fig. 1) which are attached at their lower ends to gusset plates 23.

Figure 4:
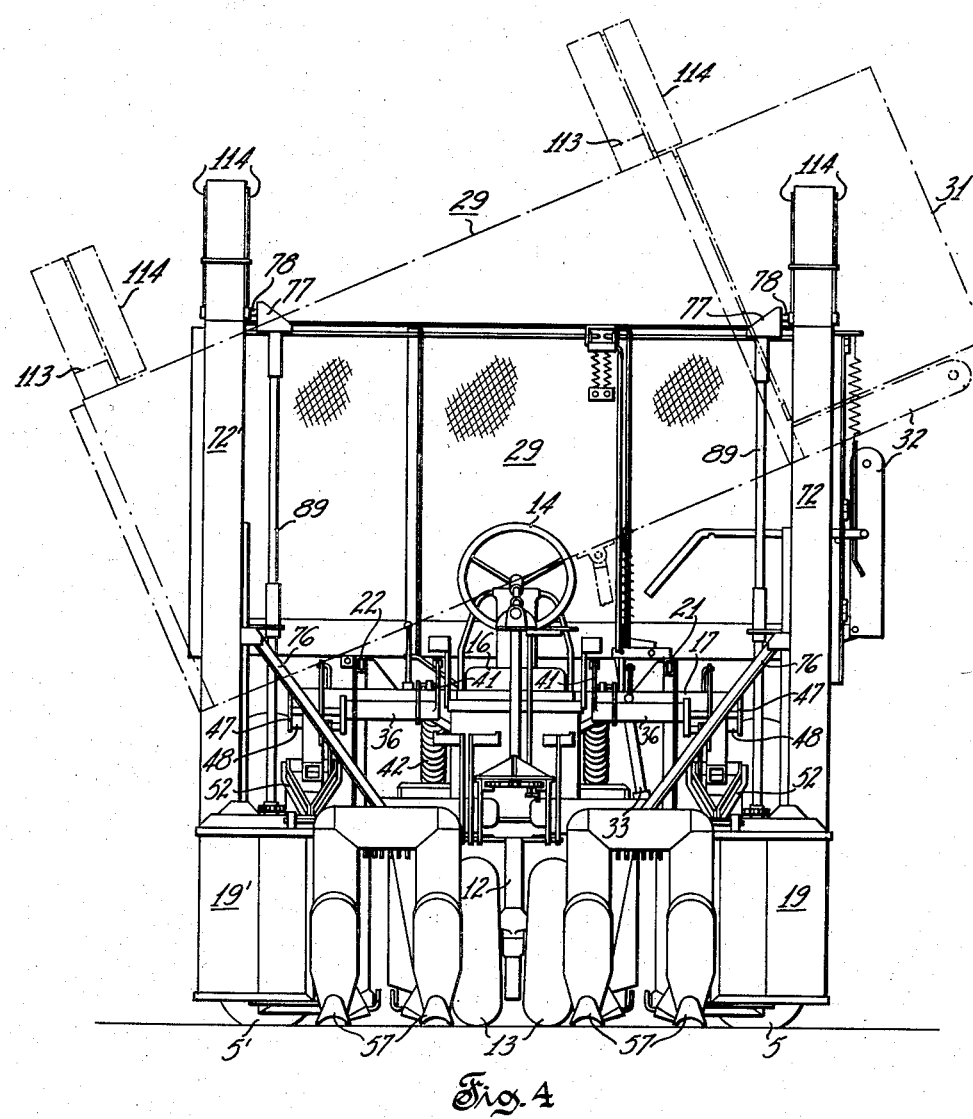
Fig. 4 is a front view of the cotton harvester with the receptacle shown in discharge position in broken lines.

A picked cotton receiving basket or receptacle 29 is pivotally attached to frame member 22 (Fig. 4). In broken lines, the basket 29 is shown in its raised or cotton discharging position with its end gates 31 opened up and its floor extension 32 lowered. It will be understood that the cotton is moved up to and discharged from the elevated end of floor extension 32 by means of an endless type floor conveyor generally indicated by the reference character 30 in Figs. 2 and 3. The mechanism for raising this basket includes a hydraulic ram 33 (Fig. 1) carried by frame member 8 and connected at its upper end to an under portion of basket 29. Hydraulic ram 33 is operatively connected to a pump 34 drivenly attached to engine 2 and this ram includes controls conveniently positioned near operator's station 16.

The picking unit 19 is mounted at the right side of the machine for up and down adjustment by means of a parallel linkage and actuating mechanism which will be more fully described hereinbelow, and a corresponding parallel linkage and actuating mechanism are provided at the left side of the machine for mounting the other picking unit 19'.

Referring to the picking unit 19 (Fig. 1) and its associated parallel linkage, a forward suspension link 49 is pivotally mounted on a stub shaft 45 rigidly carried by depending plate 47. A reach arm 50 and a cam shoe 51 are rigidly secured, as by welding, to suspension link 49. A hanger bracket or yoke 52 is rigidly secured to a mid-longitudinal portion of the unit 19 and is pivotally secured to the lower end of suspension link 49 by means of shaft 55. A link 53 is pivotally attached to and connects the upper end of reach arm with the upper arm of another bell crank lever 54 pivotally supported by stub shaft 60 fixedly mounted on gusset plate 23 attached to the end of frame member 8. The rear end of the picking unit 19 is supported by bracket 56 pivotally attached to the lower arm of bell crank 54.

Referring to Figs. 3 and 4, a pair of transversely extending tubes 36 are rigidly supported forwardly from tube 17. Tubes 36 each pivotally support a rock shaft 37 (Fig. 1) having a crank element 38 at one end thereof fixedly mounting a stub shaft rotatably supporting a roller 39 and having a lever arm 41 fixed to the other end thereof. A counter-balancing spring 42 connects the upper end of lever arm 41 with a bracket 43 fixed to engine frame 3. A rod 44 has its forward end pivotally connected to a midportion of lever 41 and its rear end (not shown) is operatively connected to ram 46 through suitable linkage including bell crank 40 and rock shaft 40' (Fig. 3) for movement thereby. Ram 46 is supported on frame portion 11 and is operatively connected to hydraulic pump 34. Action of ram 46 is controlled by control lever 34' positioned at a convenient distance from station 16.

The forward transverse frame tube 17 has a vertically extending plate 47 (Figs. 1 and 4) attached thereto. Tube 17 by means including plate 47, mounts a fixed shaft 45 (Fig. 1) which pivotally supports a tube 48 having the suspension link 49 (Fig. 1) rigidly attached thereto. Cam shoe 51 is positioned to coact with roller 39. In operation actuation of ram 46 results in a rearward movement of link 44 as viewed in Fig. 1. This rearward movement pivots the lever arm 41 and associated rock shaft 37 in a clockwise direction as viewed in Fig. 1, thus causing cam roller 39 to coact against cam shoe 51 thereby moving the latter and its associated picking unit in an upward direction. The picking unit remains parallel to the ground during raising due to the parallel relationship of suspension link 49 and the lower arm of bell crank 54 which is maintained in all positions of vertical adjustment by the spacing provided by link 53.

Each picking unit 19, 19' is provided with a pair of plant dividers 57 (Fig. 3) for straddling a plant row, the dividers being on the sides of the units 19 and 19' adjacent longitudinal frame member 11. The units 19 and 19' may be considered as formed in pairs having symmetrical right and left hand characteristics and for the sake of avoiding repetition only one of the units will be described. Each unit has a bottom plate 58 (Fig. 2) rotatably supporting a vertically extending rear shaft 59 (Fig. 5) having upper and lower slat drive sprockets 61 and 62, respectively, attached thereto. An elevator drive sprocket 63 and a power input sprocket 64 are also attached to the upper end of shaft 59. A forward vertical shaft 66 (Fig. 3) is rotatably supported from bottom plate 58 and has attached thereto a pair of vertically spaced idlers 67 in alignment with sprockets 61 and 62 for supporting upper and lower chains 68. Upper and lower chains 68 are connected by a series of vertically extending slats 69 (Fig. 5) which carry cotton picking spindles 71. This slat carrier as a whole moves in the elongated generally oval path indicated in Fig. 3 and the functions of moistening the spindles, picking cotton from open bolls, and subsequent removal of the cotton from the spindles occur incident to the travel of the spindle carrier about this elongated path.

The power train whereby the picking unit 19 is driven includes a power take-off shaft 90 (Fig. 5) which is in driving relation to gear box 93. A driven gear 92 is mounted on gear box 93 and a driven chain 95 is trained about gear 92 and about the power input sprocket 64 for the picking unit 19. Rotation of sprocket 64 moves the slat carrying chains 68 about the oval path described above. It will be understood that the power take-off shaft 90 may be selectively actuated to drive the picking unit by conventional means not shown. A similar power train including a driven gear 92' (Fig. 3), chain 95' is provided to drive picking unit 19'.

Figure 5:
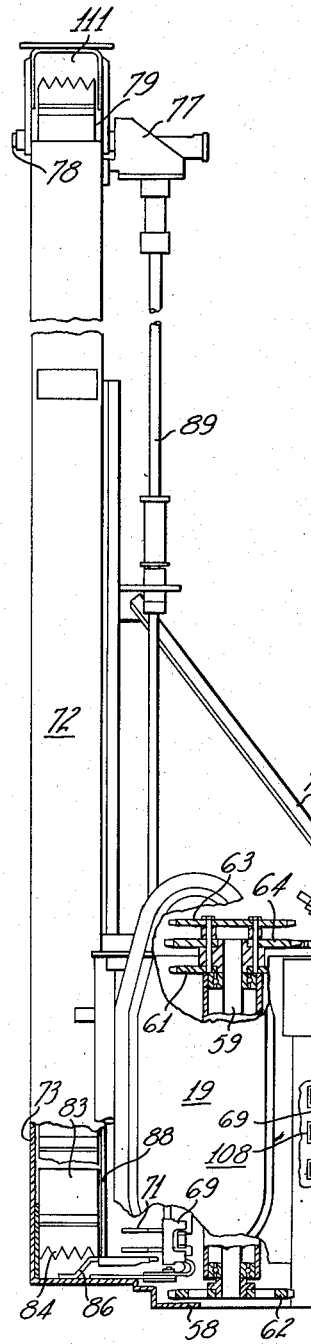
Fig. 5 is an enlarged rear elevational view, with parts broken away and shown in section, of a picker unit and elevator.
Figure 6:
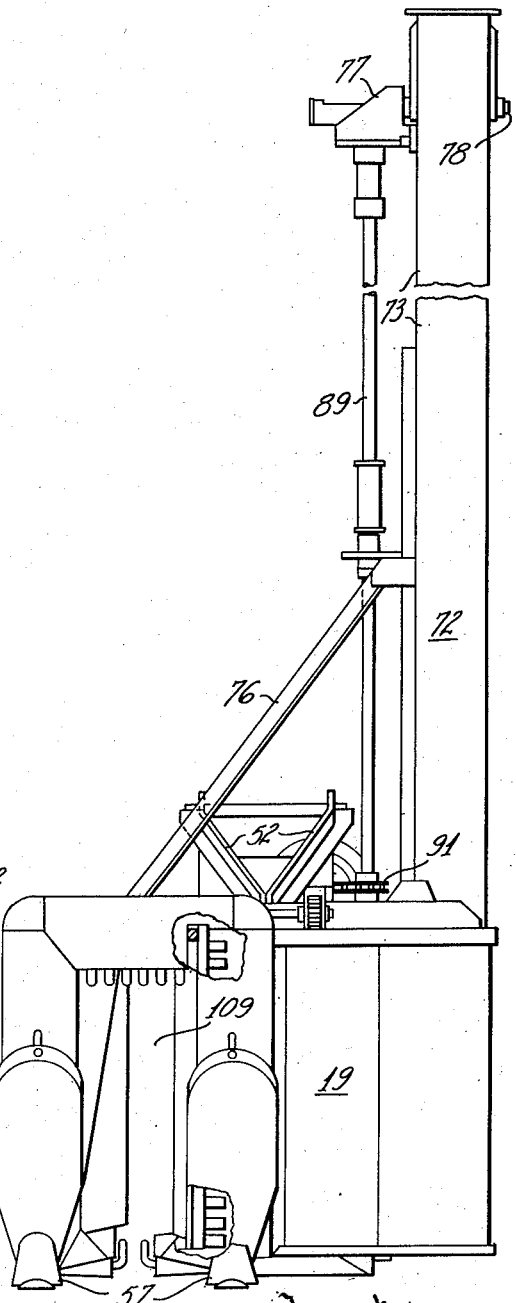
Fig. 6 is a front elevational view of the picker unit and elevator shown in Fig. 5 with parts broken away and shown in section.

The reference characters 72 and 72' (Fig. 3, 5 and 6) identify picked cotton elevating devices. The picked material elevating device or conveyor 72 (Fig. 5) is carried by base plate 58 and includes an outer wall structure or conduit 73. This conduit is suitably braced by a horizontally extending angle iron 74 (Fig. 7), and by an upwardly extending laterally inclined brace 76 (Fig. 6). The upper end of conduit 73 carries a box 77 enclosing gearing including a rotatable shaft 78 which extends through the conduit and is journaled therein. A drive pulley 79 is attached to shaft 78 between the walls of conduit 73. A similar driven pulley 81 and shaft 82 (Fig. 7) are rotatably received in the bottom portion of the elevating device 72. An endless belt 83 having pocket forming members or flights 84 thereon passes about pulleys 79 and 81. The flight members are positioned at spaced intervals on the belt 83 and present horizontal material supporting surfaces which travel vertically adjacent the discharge ends of the stripping devices or shoes 87. An inclined floor member 86 (Fig. 5) is carried by floor plate 58 adjacent the intake side of the lower end of elevating conveyor 72 and serves to direct harvested material which has fallen from stripping devices 87 (Fig. 7) into the elevator 72. A material receiving opening 88 in the wall structure 73 of elevating conveyor 72 extends from floor 58 to a point substantially in horizontal alignment with sprocket 61 and exposes a plurality of the flights 84. A discharge port or outlet opening is provided in the elevated end of conduit 73 which communicates with basket 29 as will be more fully explained below. A vertical shaft 89 has its upper end drivingly connected to the gearing within box 77 and has its lower end journaled in a plate carried by an upper portion of picking unit 19. Attached adjacent the lower end of shaft 89 is a sprocket 91 (Fig. 6) which is drivenly connected by means of a chain to sprocket 63 (Fig. 5). Sprocket 64 is chain connected to sprocket 92 of gear box 93 which is operatively connected to power take-off shaft 7 by suitable gearing not shown.

As indicated in Fig. 7, the slats 69 in passing around upper and lower rear sprockets 61 tend to whip due to their pivotal connection with chains 68 and assume a generally radial position relative to the sprocket. In order to recline the slats, a hold back disc 90 is rotatably mounted on a bracket carried by frame member 94, in position to contact an upper end portion of each slat as it moves past the disc, such contact positioning the slat with its spindles disposed at a proper angle for passing through stripping devices 87. Located in adjacent forward relation to hold back disc 90 and attached at its upper end to frame member 94 (Fig. 7 is a U-shaped slat retaining member 96 which by having one leg 97 thereof in contact with a portion of the slats functions to maintain the slats positioned with their spindles disposed at the desired stripping angle as they enter stripping devices 87.

The stripping devices 87 are attached to a vertical channel member 98 which is attached at its lower end to plate 58 and to angle member 74 through suitable gusset plates 100. Each stripping device 87 includes a stripping shoe 101, generally V-shaped in cross section, attached to a support 102 carried by channel member 98. Received within the V-shaped configuration of shoe 101 is a spreader plate 103 provided with an outwardly curved cotton deflecting portion 104 at the discharge ends 105 of the stripping means. An additional guide member or deflector 106 is mounted adjacent to deflecting portion 104 in coacting relation thereto so as to direct cotton into the receiving opening 88 of conveyer 72 or onto curved floor member 86 which slants downwardly to the lower end of the opening in the elevating conveyer 72. As previously indicated, the opening 88 in the lower or receiving end of the elevating conveyer extends from the floor to the top of the stripping devices and closely adjacent the discharge ends thereof, and because of this contiguous relationship the cotton usually is fed horizontally from the stripping devices into the pockets formed by paddle elements or flights 84 and belt 83.

In addition, by reference to Fig. 7, it will be seen that as the cotton bolls are stripped free of a spindle, the free bolls are impelled toward deflectors 104 and 106 by the next oncoming spindle and any bolls thereon, the free bolls being guided by the spreader plate and these curved deflectors to enter the pockets presented by the active course of the elevating conveyer. A partial vacuum is also formed by the upward movement of the pocket forming paddle elements in conduit 73 and such vacuum additionally helps to draw or inspirate air through the stripping devices and carry the stripped cotton horizontally from the discharge end of the stripping devices into these pockets for elevation to the storage basket.

After the spindles leave the stripping devices 87 they continue around the generally oval path followed by the slats and pass through spindle moistening devices 107 (Fig. 3), and then into engagement with spindle drive tracks indicated generally at 108 which rotate the spindles while they are in the picking tunnel 109 of the unit. Upon emergence from the tunnel 109 the spindle slats move against the spindle positioning devices 90 and 96 (Fig. 7) and then move to the spindle stripping devices.

Referring to Fig. 2, it is seen that elevating conveyer 72 is carried by picking unit 19 and moves therewith when the picking unit is raised or lowered. The lower or receiving end of conveyer 72 is mounted adjacent curved plate 86 (Fig. 5) on bottom member 58 and extends upward therefrom alongside the stripping devices in position to receive cotton removed from the spindles by these devices. The conveyer elevates the cotton and discharges same through a discharge opening or port 111 (Fig. 5) at the upper end of conduit 73 into hood structures 112 (Fig. 2) carried by basket 29 and over a throat member 113 (Fig. 4) which is also carried by basket 29. The upper end of elevating conveyer 72 coacts with a pair of vertical flap members 114 which are positioned adjacent opposite sides of throat member 113 to confine and shield the cotton from adverse winds as it traverses the throat member upon leaving the conveyer.

Figs. 8 through 14 show an arrangement embodying the invention, for moving cotton from the picking units to the basket and including a different type of power take-off connection. This arrangement also utilizes an endless belt, paddle or flight type elevating conveyer 116 supported on the picking unit. However, the conveying unit does not discharge directly into the basket but instead discharges into a transverse horizontally extending cotton feeder main or conduit 117 having upwardly extending cotton receiving end portions 118 carried by the basket supporting frame structure. A blower 119 is supported by the basket supporting frame in underlying relation to the basket and has its outlet pipe or cotton delivering duct 121 connected to a midportion of pipe or main 117 in partially enclosing or surrounding relation thereto, blower 119 being operatively connected to a power take-off shaft 122 which is in turn connected to an engine (not shown) by suitable power transmitting means enclosed in casing 120. Main 117 has a discharge aperture 123 (Fig. 13) through a top side portion in spaced relation to the ends thereof. The aperture is surrounded by blower discharge pipe 121 and 126, main 117 being positioned to narrow the duct into a constricted throat portion which is operative to increase the velocity of the air flowing therethrough, and thereby reduce the pressures on discharge aperture 123 and create a partial vacuum over opening 123 thereby utilizing a suction action in main 117 to move picked cotton, deposited into the ends thereof by conveyer 116, inward toward central opening 123 and upward therethrough into the blower air stream. The cotton is then blown through tube or duct 124 which forms an upward continuation of blower discharge pipe 126 and extends rearward over the basket 29 to a point of discharge adjacent the opposite end of the basket. With reference to Figs. 8 and 13 it will be seen that ducts 121, 126 and 124 are in direct communication with each other and form a continuous passage or duct 125 which extends from the blower 119 to the basket 29. Referring particularly to Fig. 13 it will be noted that the duct 125 has a narrow constricted throat portion 120 at the discharge aperture 123 in the feeder main 117. This constriction is formed by passing the feeder main 117 through the duct 125 at the juncture points of duct segments 121 and 126. It would, of course, be possible to constrict the duct in other ways. An intermediate section of the portion of pipe 124 overlying basket 29 has no bottom and this section is provided with an inclined grill 127. The cotton passing through conduit 124 impinges on grill 127 and having thus lost its velocity in a horizontal direction drops down from grill 127 and into the basket, while the bulk of the smaller particles of dirt and the like pass through the grill and are discharged from conduit 124 at the rear of the basket. To permit easy raising of the basket, tube 124 is attached to basket 29 and has a flange 130 for horizontal flush fit with the top end of blower discharge pipe 126 so that when basket 29 is raised the lower end of discharge pipe 124 simply moves upward away from the top end of pipe 126. It will be noted that pipe 117 has a centrally located baffle plate 128 (Fig. 14) which divides the blast of air transversely as the air enters pipe 121 thereby eliminating interference between the streams of material inspirated from the opposite ends of pipe 117.

While the invention illustrated by Figs. 8 to 14 incorporates a centrifugal fan such as the fan 119 for delivering an air blast into the cotton conduit system, it should be noted that the picked cotton does not pass through the fan and that the cotton is not otherwise exposed to violent beating which might result in the cracking of seeds and other harmful effects.

It is to be understood that it is not desired to limit the invention to the particular features and details described hereinabove and that the invention is to be considered as including such other forms and modifications as are fairly embraced within the scope of the appended claims.

It is claimed and desired to secure by Letters Patent:

1. In a cotton harvester including a support, a picking unit mounted on said support and a picked cotton receiving basket mounted on said support, a conveying system for delivering picked cotton from said unit to said basket comprising an elevating conveyer mounted on said support and positioned in cotton receiving relation to said unit and having an elevated cotton discharge port, a cotton feeder main mounted on said support in cotton receiving relation to said port and presenting a discharge aperture, a cotton delivering duct mounted on said support and having an opening intermediate its ends in communication with said feeder main discharge aperture, one end of said duct communicating with said basket, means on said support for effecting a flow of air through said duct from its other end toward said basket, said duct having a narrow constricted throat portion at said opening communicating with said feeder main discharge aperture, said constricted throat portion being operative to increase the velocity of air flowing therethrough and thereby reduce the pressure on said discharge aperture to create a suction in said feeder main operative to inspirate cotton from said port through said feeder main into the current of air passing through said duct to said basket.

2. In a cotton harvester including a support, a pair of picking units mounted on said support and a picked cotton receiving basket mounted on said support, a conveying system for delivering picked cotton from said units to said basket comprising endless belt type conveyers mounted on said support in cotton receiving relation to said units and having elevated, relatively spaced cotton discharge ports, a cotton feeder main mounted on said support and having opposite ends positioned in cotton receiving relation to said ports and presenting a discharge aperture intermediate said ends thereof, a cotton delivering duct mounted on said support in partially surrounding relation to said feeder main at said discharge aperture and communicating with said basket, means on said support for effecting a flow of air through said duct toward said basket, said duct having a constricted throat portion at said feeder main discharge opening operative to increase the velocity of air flowing therethrough and thereby reduce the pressure on said discharge aperture to create a suction in said feeder main operative to inspirate cotton from said port through said main into the current of air passing through said duct.

3. In a cotton harvester including a support, a pair of picking units mounted on said support and a picked cotton receiving basket mounted on said support, a conveying system for delivering picked cotton from said units to said basket comprising a pair of endless belt type conveyers mounted on said support in cotton receiving relation to said units and having elevated, relatively spaced cotton discharge ports, a cotton feeder main mounted on said support and having opposite ends positioned in cotton receiving relation to said ports and presenting a discharge aperture spaced from the ends thereof, a baffle plate mounted transversely in said main and bisecting said discharge aperture, a cotton delivering duct mounted on said support and partially surrounding said feeder main, baffle plate and discharge aperture and communicating with said basket, means on said support for effecting a flow of air through said duct toward said basket, said duct having a narrow constricted throat portion at said feeder main discharge aperture operative to increase the velocity of air flowing therethrough and thereby reduce the pressure on said discharge aperture to create a suction in said feeder main operative to inspirate cotton from said port through said feeder main and into the current of air passing through said duct to said basket.

4. In a cotton harvester the combination of a support, picking spindles rotatably mounted on said support, a vertical series of stationary stripping devices mounted on said support and cooperable with said spindles and each having a picked cotton discharge end, a stripped cotton receiving receptacle mounted on said support in elevated relation to said stripping devices and stripped cotton conveying means mounted on said support in cotton conveying relation between said stripping devices and receptacle, said conveying means comprising a conduit structure having a vertically elongated inlet opening in stripped cotton receiving relation to said discharge ends of said stripping devices and an elevated outlet port, a lower belt pulley rotatably mounted on said support adjacent the lower end of said inlet opening, an upper belt pulley mounted on said support and spaced from said lower belt pulley in the longitudinal direction of said conduit structure, an endless conveyer belt trained about said pulleys, drive means on said support for one of said pulleys operative to move said belt in ascending direction within said conduit structure past said inlet opening, flight members secured to said belt for cooperative engagement with stripped cotton delivered into said conduit structure through said inlet opening of the latter, a cotton feeder main mounted on said support in cotton receiving relation to said port and presenting a discharge aperture, a cotton delivering duct mounted on said support and having an opening communicating with said feeder main at said discharge aperture and communicating with said basket, means on said support for effecting a flow of air through said duct toward said basket, said duct having a narrow constricted throat portion at said feeder main discharge opening operative to increase the velocity of air flowing therethrough and thereby reduce the pressure on said discharge aperture to create a suction in said feeder main operative to inspire cotton from said discharge port into the current of air passing through said duct.

References Cited in the file of this patent

UNITED STATES PATENTS

| | | |
|---|---|---|
| 362,041 | Sailor | Apr. 26, 1887 |
| 723,985 | Cannan | Mar. 31, 1903 |
| 767,058 | Harvin | Aug. 9, 1904 |
| 1,259,356 | Cannan | Mar. 12, 1918 |
| 1,420,015 | Bernert | June 20, 1922 |
| 1,585,876 | Quade | May 25, 1926 |
| 1,959,070 | Thoman | May 15, 1934 |
| 1,985,373 | Johnston | Dec. 25, 1934 |
| 1,995,273 | Dohrwardt | Mar. 19, 1935 |
| 2,066,866 | White | Jan. 5, 1937 |
| 2,401,152 | Hagen | May 28, 1946 |
| 2,520,927 | Hagen | Sept. 5, 1950 |
| 2,558,951 | Hagen et al. | July 3, 1951 |